(No Model.) 2 Sheets—Sheet 1.
C. A. TREDWELL.
BICYCLE BELL.
No. 598,259. Patented Feb. 1, 1898.
Fig. I.
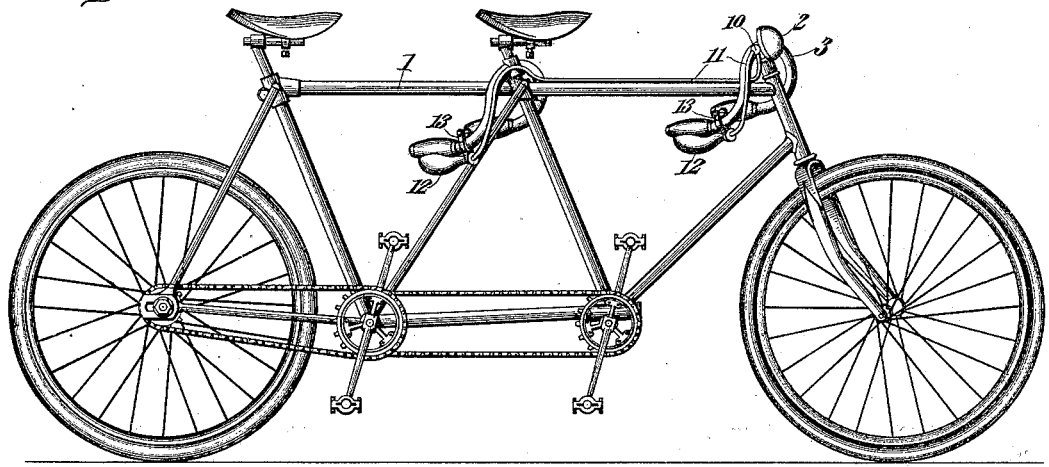
Fig. II.
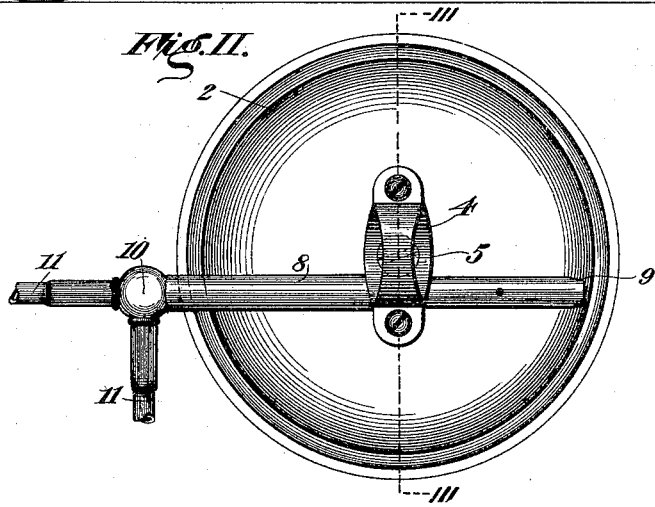
Fig. III.
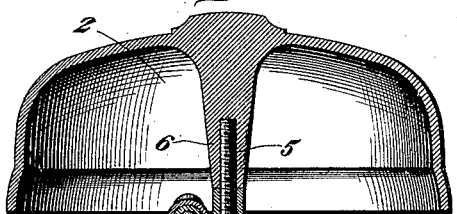
Witnesses
M. E. Fowler
Chester A. Baker
Inventor:
Charles A. Tredwell
By Joseph L. Atkins
Attorney
THE NORRIS PETERS CO., PHOTO-LITHO., WASHINGTON, D. C.

(No Model.) 2 Sheets—Sheet 2.
C. A. TREDWELL.
BICYCLE BELL.
No. 598,259. Patented Feb. 1, 1898.
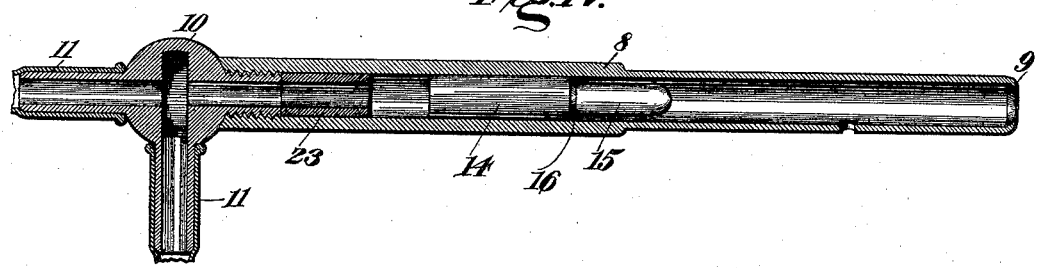
Fig. IV.
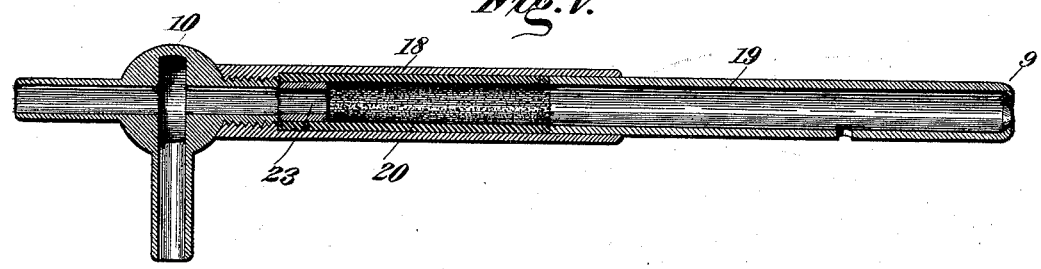
Fig. V.
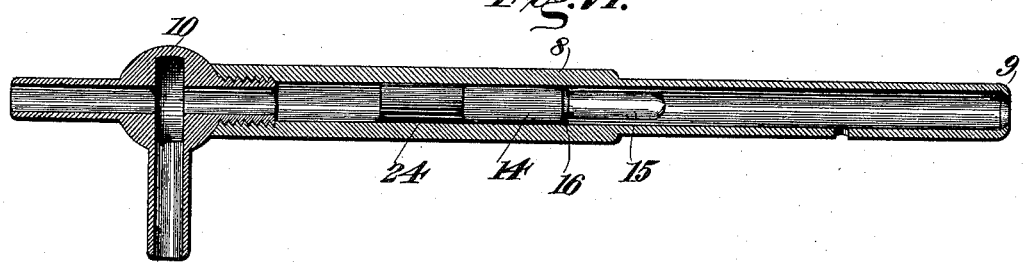
Fig. VI.
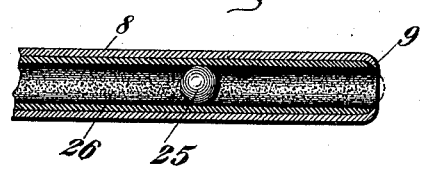
Fig. VII.
Witnesses
M. E. Fowler
Chester A. Baker.
Inventor:
Charles A. Tredwell,
By Joseph L. Atkins,
Attorney.

UNITED STATES PATENT OFFICE.

CHARLES A. TREDWELL, OF BRISTOL, CONNECTICUT, ASSIGNOR TO THE BRISTOL BELL COMPANY, OF SAME PLACE.

BICYCLE-BELL.

SPECIFICATION forming part of Letters Patent No. 598,259, dated February 1, 1898.

Application filed June 11, 1897. Serial No. 640,350. (No model.)

*To all whom it may concern:*

Be it known that I, CHARLES A. TREDWELL, of Bristol, in the county of Hartford, State of Connecticut, have invented certain new and useful Improvements in Bells, of which the following is a complete specification, reference being had to the accompanying drawings.

The object of my invention is to produce a pneumatically-actuated bell especially designed to be employed as a bicycle alarm-bell.

In the accompanying drawings, Figure I is a perspective view of a tandem bicycle equipped with my bell. Fig. II is a bottom plan view of the bell proper or gong with the direct gong-sounding mechanism detached. Fig. III is a section on the line III III of Fig. II. Fig. IV is a longitudinal sectional view of the simplest form of plunger-tube and plunger within the same. Fig. V is a similar view of a modified plunger-tube. Fig. VI shows a still further modification in which the recoil-packing shown in Fig. IV is carried upon the plunger instead of fixed within the tube. Fig. VII is a similar view of the front of the tube, illustrating a spherical plunger in place of the oblong plunger shown in the other figures.

Referring to the figures on the drawings, 1 indicates a bicycle represented as a support for my bell mechanism. The gong 2 of my bell mechanism is secured to the handle-bar 3 of the bicycle, as by a split collar 4. One-half of the split collar is secured by a screw 5 to a central stud 6 of the gong. The half of the split collar secured by the screw serves also by the aid of the screw to secure to the stud 6 a metallic strap 7, which maintains in place in operative relation with the gong my direct gong mechanism.

As illustrated, the gong-sounding mechanism consists of a plunger-tube 8, which the strap 7 encircles. The tube in its simplest form, as illustrated in Fig. IV, is provided with a constricted forward end 9 and communicates at its rearward end with a source of pneumatic energy. As illustrated, the tube is screwed at its rearward end to a ball 10, to which one or more tubes 11 is operatively connected. The tubes 11 at the ends opposite the ball communicate, respectively, with compressible bulbs 12, the bulbs being in this case the source of pneumatic energy and secured to the bicycle-frame, as by means of screw-compressed clips 13.

In the application of my invention to a bicycle one bulb would be provided for each rider. Consequently in the tandem form of bicycle illustrated two bulbs communicating with the ball 10 of the tube 8 are provided.

In the simpler form of plunger-tube illustrated in Fig. IV, I provide an oblong plunger having a body part 14, which fits snugly within the tube and terminates in a reduced striking end 15, the striking end being defined from the body part by a shoulder 16, which, through engagement with the constricted end 9 of the plunger-tube, prevents escape of the plunger from the tube under all conditions.

The means of confining the plunger within the plunger-tube may of course be varied, that illustrated being by way of example.

It is desirable in all high-class bicycle-bell mechanism to prevent rattling, and a form of plunger designed for that purpose is illustrated in Fig. V. In that figure the plunger-tube is composed of a rearward barrel or tube 18 of larger diameter and a forward tube 19 of smaller diameter fitting within the interior of the forward end of the tube 18. The tube 19 may telescope into the tube 18, where it may be permanently secured, as by brazing, or the smaller tube may be screwed within the other or otherwise united thereto, as preferred.

Within the interior of the tube 18 I provide a lining 20, of packing material, corresponding in thickness with the tube 19, whereby the internal diameter of the tube 18 is rendered equal to that of the tube 19, but is also rendered noiseless through contact with the plunger when the plunger is retracted into it.

I provide suitable mechanism for preventing wear through the striking of the plunger against the metallic end of the tube 18—that is to say, of the ball 10. For this purpose a packing-ring 23 in the end of the tube 18, next to the ball, having an air-passage through it, may be employed, or, as shown in Fig. VI, in place thereof the plunger may be provided with a packing-ring 24.

The form of the plunger may be varied, as above suggested, and in Fig. VI, I illustrate a spherical plunger 25. To prevent rattling of the spherical plunger within the tube, the latter may be lined with packing material 26. (See Fig. VII.)

In operation the plunger, of whatever form, is driven forward by pneumatic energy supplied through the plunger-tube and is forced through the constricted end of the plunger-tube a sufficient distance to make contact with and sound the gong. In order to produce a clear musical tone through contact with the gong, it is desirable that the plunger should rebound promptly. For that reason suitable pneumatic relief mechanism should be provided. In the simple form illustrated the relief mechanism consists of an aperture located toward the forward end of the plunger-tube and at such a distance from the end thereof that the plunger may be driven through its tube with full force of the pneumatic energy supplied, but which will, when the plunger has reached its destination, allow the escape of air, thereby preventing the forming of an air-cushion and permitting the prompt rebound of the plunger.

What I claim is—

1. The combination with a gong and stud, of a screw, a strap secured by the screw to the stud, a plunger-tube encircled by the strap, a plunger working within the tube, and means of communicating pneumatic energy to the tube, substantially as set forth.

2. In bell mechanism, the combination with a gong and plunger-tube communicating with a source of pneumatic energy, of a lining of packing material within the tube, and a plunger working therein, substantially as set forth.

3. In bell mechanism, the combination with a gong, and plunger-tube communicating with a source of pneumatic energy, the plunger-tube being of different diameters, a packing within that portion of the tube of larger diameter, and a plunger working within the tube, substantially as specified.

In testimony of all which I have hereunto subscribed my name.

CHARLES A. TREDWELL.

Witnesses:
JOHN H. KIRKHAM,
CHAS. GLOVER.